US012726237B2

(12) United States Patent
Elshafie et al.

(10) Patent No.: US 12,726,237 B2
(45) Date of Patent: Sep. 1, 2026

(54) SEED FOR FORWARDING DEVICE CONFIGURATION

(71) Applicant: QUALCOMM Incorporated, San Diego, CA (US)

(72) Inventors: Ahmed Elshafie, San Diego, CA (US); Seyedkianoush Hosseini, San Diego, CA (US); Yu Zhang, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 18/264,384

(22) PCT Filed: Apr. 28, 2021

(86) PCT No.: PCT/CN2021/090475
§ 371 (c)(1),
(2) Date: Aug. 4, 2023

(87) PCT Pub. No.: WO2022/226825
PCT Pub. Date: Nov. 3, 2022

(65) Prior Publication Data
US 2024/0120966 A1 Apr. 11, 2024

(51) Int. Cl.
*H04B 7/04* (2017.01)
*H04B 7/06* (2006.01)
*H04B 7/145* (2006.01)

(52) U.S. Cl.
CPC ....... *H04B 7/04013* (2023.05); *H04B 7/0634* (2013.01); *H04B 7/06968* (2023.05); *H04B 7/145* (2013.01)

(58) Field of Classification Search
None
See application file for complete search history.

(56) References Cited

U.S. PATENT DOCUMENTS

2023/0246674 A1* 8/2023 Åström ............. H04B 7/04013 375/262
2024/0022315 A1* 1/2024 Kusashima ........... H04W 16/26

FOREIGN PATENT DOCUMENTS

CN 111245492 A 6/2020

OTHER PUBLICATIONS

International Search Report and Written Opinion—PCT/CN2021/090475—ISA/EPO—Oct. 20, 2021.

(Continued)

*Primary Examiner* — Minh Trang T Nguyen
(74) *Attorney, Agent, or Firm* — Harrity & Harrity, LLP

(57) ABSTRACT

Various aspects of the present disclosure generally relate to wireless communication. In some aspects, a transmitting device (405) selects an indication of a seed to be used by a forwarding device (350), such as a passive device with a reconfigurable intelligent surface, to generate a configuration for reflecting or forwarding signals. The transmitting device transmits the indication of the seed to the forwarding device (605). The transmitting device transmits the signals (625) to a receiving device via the forwarding device. The transmitting device receives measurements of the signals (630). Numerous other aspects are described.

29 Claims, 13 Drawing Sheets

(56) References Cited

OTHER PUBLICATIONS

Marco, D.R., et al., “Smart Radio Environments Empowered by Reconfigurable Intelligent Surfaces: How it Works, State of Research, and Road Ahead”, Arxiv.Org, Cornell University Library, 201 Olin Library Comell University Ithaca, NY14853, Apr. 20, 2020, XP081648502, pp. 1-74.
Renzo M.D., et al., “Reconfigurable Intelligent Surfaces vs. Relaying: Differences, Similarities, and Performance Comparison”, IEEE Open Journal of the Communications Society, IEEE, vol. 1, Jun. 16, 2020, pp. 798-807, XP011797329, DOI: 10.1109/OJCOMS.2020.3002955 [retrieved on Jul. 1, 2020] the whole document.
Nadeem Q-U-A., et al., “Intelligent Reflecting Surface Assisted Wireless Communication: Modeling and Channel Estimation”, ArXiv: 1906.02360v2 [eess.SP], Dec. 13, 2019, pp. 1-7.
You C., et al., “Fast Beam Training for IRS-Assisted Multiuser Communications”, ArXiv:2005. 11652v2 [cs. IT], Jun. 27, 2020, pp. 1-5.

* cited by examiner

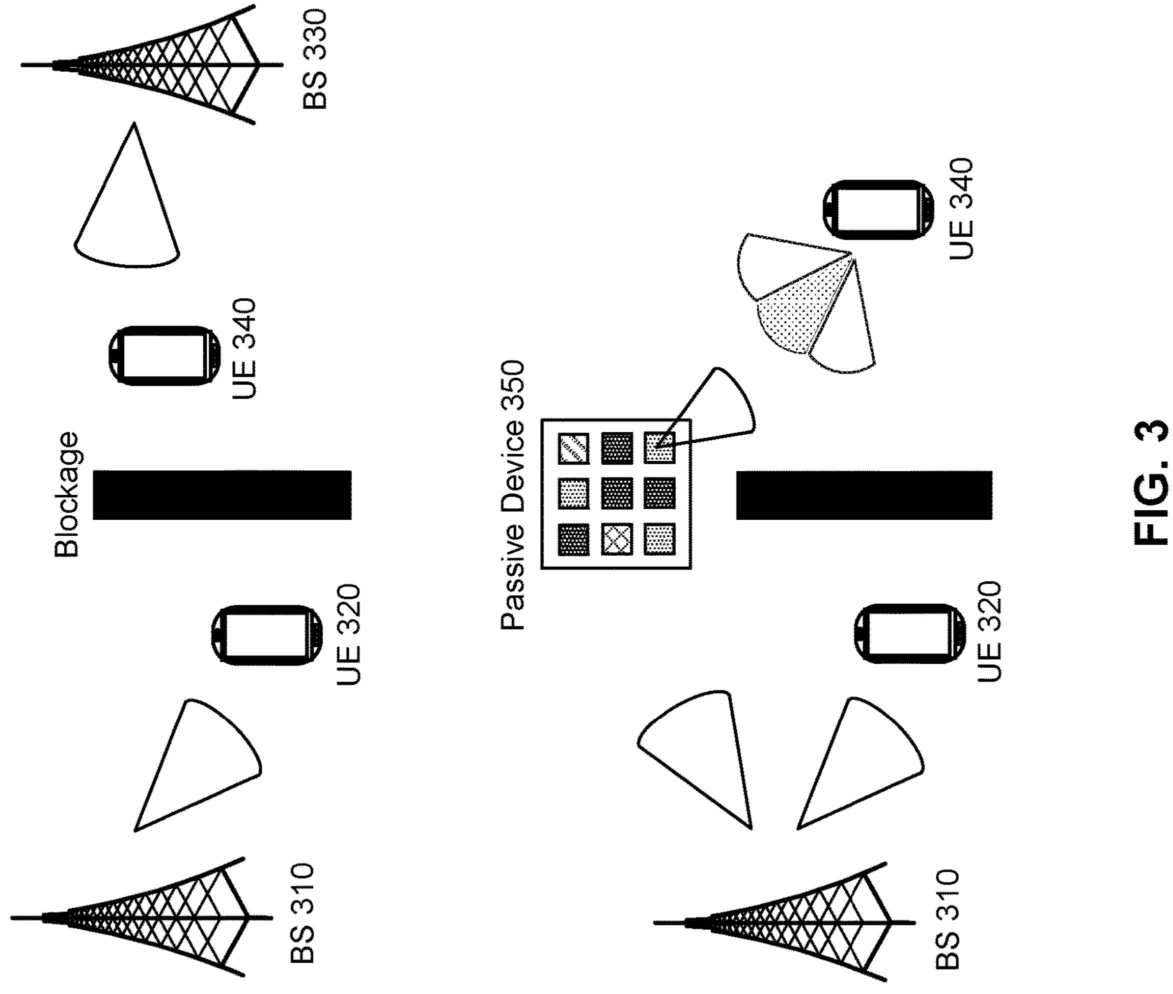
FIG. 3

500

700

1000

SEED FOR FORWARDING DEVICE CONFIGURATION

CROSS-REFERENCE TO RELATED APPLICATION

This Patent Application is a 371 national stage of PCT Application No. PCT/CN2021/090475 filed on Apr. 28, 2021, entitled "SEED FOR FORWARDING DEVICE CONFIGURATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for configuring forwarding devices.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a transmitting device includes selecting, by the transmitting device, an indication of a seed to be used by a forwarding device to generate a configuration for reflecting or forwarding signals, and transmitting, by the transmitting device, the indication of the seed to the forwarding device. The method may include transmitting, by the transmitting device, the signals to a receiving device via the forwarding device, and receiving, by the transmitting device from the receiving device, measurements of the signals.

In some aspects, a method of wireless communication performed by a forwarding device includes receiving, by the forwarding device from a transmitting device, an indication of a seed to be used by the forwarding device to generate a configuration for reflecting or forwarding signals transmitted from the transmitting device. The method may include generating, by the forwarding device, the configuration based at least in part on the seed, and configuring, by the forwarding device, the forwarding device to reflect or forward the signals according to the configuration.

In some aspects, a method of wireless communication performed by a receiving device includes receiving, by the receiving device from a transmitting device, an indication of a seed to be used by a forwarding device to generate a configuration for reflecting or forwarding signals transmitted from the transmitting device, and configuring, by the receiving device, the receiving device to receive signals reflected or relayed from the forwarding device based at least in part on the configuration.

In some aspects, a transmitting device for wireless communication includes a memory and one or more processors, coupled to the memory, configured to select an indication of a seed to be used by a forwarding device to generate a configuration for reflecting or forwarding signals, transmit the indication of the seed to the forwarding device; transmit the signals to a receiving device via the forwarding device, and receive measurements of the signals.

In some aspects, a forwarding device for wireless communication includes a memory and one or more processors, coupled to the memory, configured to receive an indication of a seed to be used by the forwarding device to generate a configuration for reflecting or forwarding signals transmitted from the transmitting device, generate the configuration based at least in part on the seed, and configure the forwarding device to reflect or forward the signals according to the configuration.

In some aspects, a receiving device for wireless communication includes a memory and one or more processors, coupled to the memory, configured to receive an indication of a seed to be used by a forwarding device to generate a configuration for reflecting or forwarding signals transmitted from the transmitting device, and configure the receiving device to receive signals reflected or relayed from the forwarding device based at least in part on the configuration.

In some aspects, a non-transitory computer-readable medium storing a set of instructions for wireless communication includes one or more instructions that, when executed by one or more processors of a transmitting device, cause the transmitting device to select an indication of a seed to be used by a forwarding device to generate a configuration for reflecting or forwarding signals, transmit the indication of the seed to the forwarding device, transmit the signals to a receiving device via the forwarding device, and receive measurements of the signals.

In some aspects, a non-transitory computer-readable medium storing a set of instructions for wireless communication includes one or more instructions that, when executed by one or more processors of a forwarding device, cause the forwarding device to receive an indication of a seed to be used by the forwarding device to generate a configuration for reflecting or forwarding signals transmitted from the transmitting device, generate the configuration based at least in part on the seed, and configure the forwarding device to reflect or forward the signals according to the configuration.

In some aspects, a non-transitory computer-readable medium storing a set of instructions for wireless communication includes one or more instructions that, when executed by one or more processors of a receiving device, cause the receiving device to receive an indication of a seed to be used by a forwarding device to generate a configuration for reflecting or forwarding signals transmitted from the transmitting device, and configure the receiving device to receive signals reflected or relayed from the forwarding device based at least in part on the configuration.

In some aspects, an apparatus for wireless communication includes means for selecting an indication of a seed to be used by a forwarding device to generate a configuration for reflecting or forwarding signals, means for transmitting the indication of the seed to the forwarding device, means for transmitting the signals to a receiving device via the forwarding device, and means for receiving measurements of the signals.

In some aspects, an apparatus for wireless communication includes means for receiving an indication of a seed to be used by the apparatus to generate a configuration for reflecting or forwarding signals transmitted from the transmitting device, means for generating the configuration based at least in part on the seed, and means for configuring the apparatus to reflect or forward the signals according to the configuration.

In some aspects, an apparatus for wireless communication includes means for receiving an indication of a seed to be used by a forwarding device to generate a configuration for reflecting or forwarding signals transmitted from the transmitting device, and means for configuring the apparatus to receive signals reflected or relayed from the forwarding device based at least in part on the configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of using a passive device, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
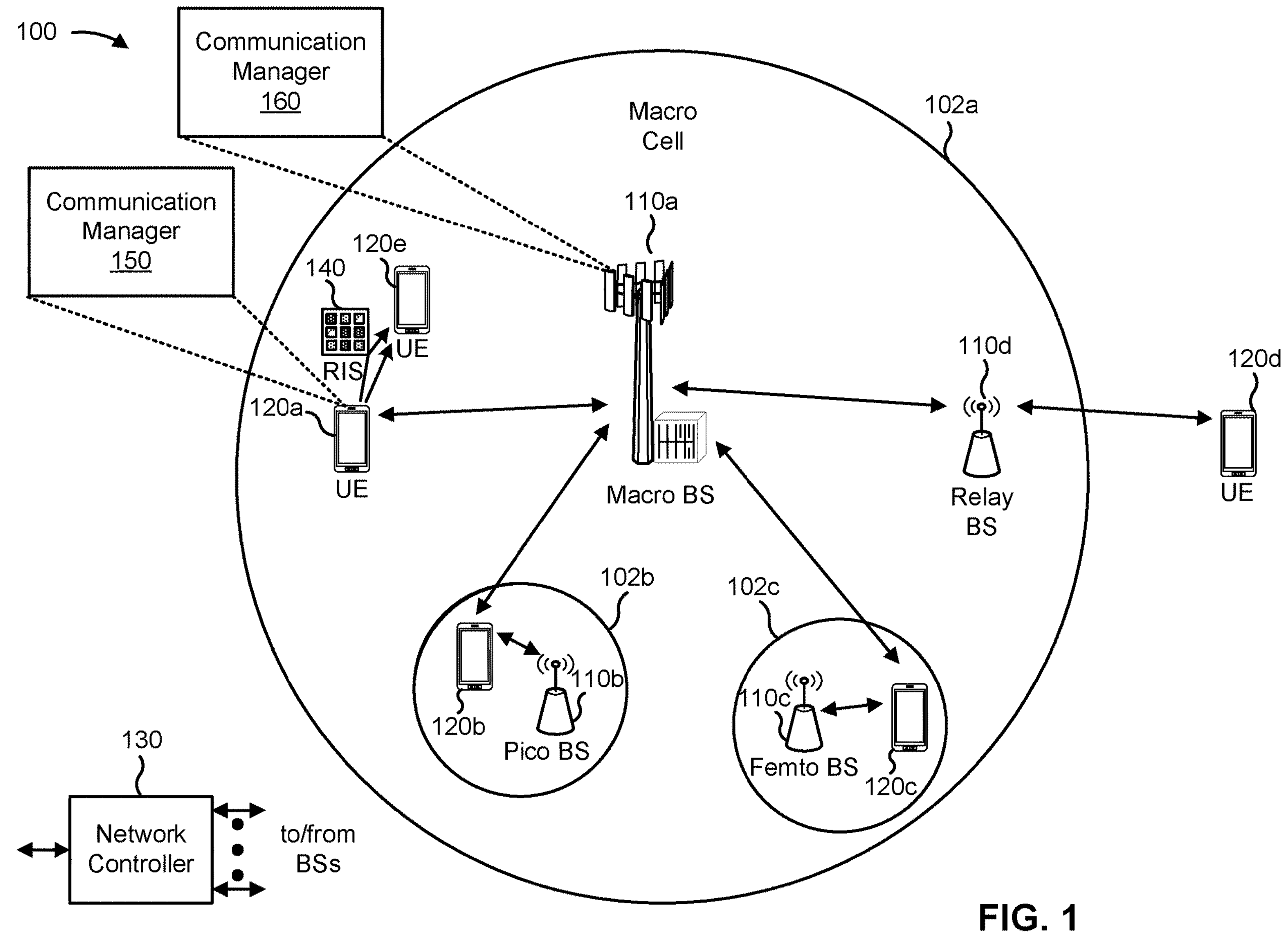
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Example 100 shows a transmitting device (e.g., UE 120*a*, base station 110) that may communicate with a receiving device (e.g., UE 120*e*, base station 110) directly or by reflecting signals via a forwarding device (e.g., a reconfigurable intelligent surface (RIS) 140). In some aspects, UE 120*a* may include a communication manager 150. As described in more detail elsewhere herein, the communication manager 150 may select an indication of a seed to be used by the forwarding device to generate a configuration for reflecting or forwarding signals, transmit the indication of the seed to the forwarding device, transmit the signals to UE 120*e* via the forwarding device, and receive measurements of the signals. In some aspects, the base station 110 may include a communication manager 160 that may select an indication of a seed to be used by the forwarding device to generate a configuration for reflecting or forwarding signals, transmit the indication of the seed to the forwarding device, transmit the signals to UE 120*e* via the forwarding device, and receive measurements of the signals. Additionally, or alternatively, the communication manager 150 or the communication manager 160 may perform one or more other operations described herein.

In some aspects, the forwarding device may include a communication manager 150. As described in more detail elsewhere herein, the communication manager 150 may receive an indication of a seed to be used by the forwarding device to generate a configuration for reflecting or forwarding signals transmitted from UE 120*a*, generate the configuration based at least in part on the seed, and configure the forwarding device to reflect or forward the signals according to the configuration. Additionally, or alternatively, the communication manager 150 may perform one or more other operations described herein.

In some aspects, UE 120*e* may include a communication manager 150. As described in more detail elsewhere herein, the communication manager 150 may receive an indication of a seed to be used by a forwarding device to generate a configuration for reflecting or forwarding signals transmitted from UE 120*a*, and configure UE 120*e* to receive signals reflected or relayed from the forwarding device based at least in part on the configuration. In some aspects, the communication manager 160 of the base station 110 may receive an indication of a seed to be used by a forwarding device to generate a configuration for reflecting or forwarding signals transmitted from UE 120*e*, and configure the base station 110 to receive signals reflected or relayed from the forwarding device based at least in part on the configuration. Additionally, or alternatively, the communication manager 150 or the communication manager 160 may perform one or more other operations described herein.

As indicated above, FIG. 1 is provided as an example. Other examples may differ from what is described with regard to FIG. 1.

Figure 2:
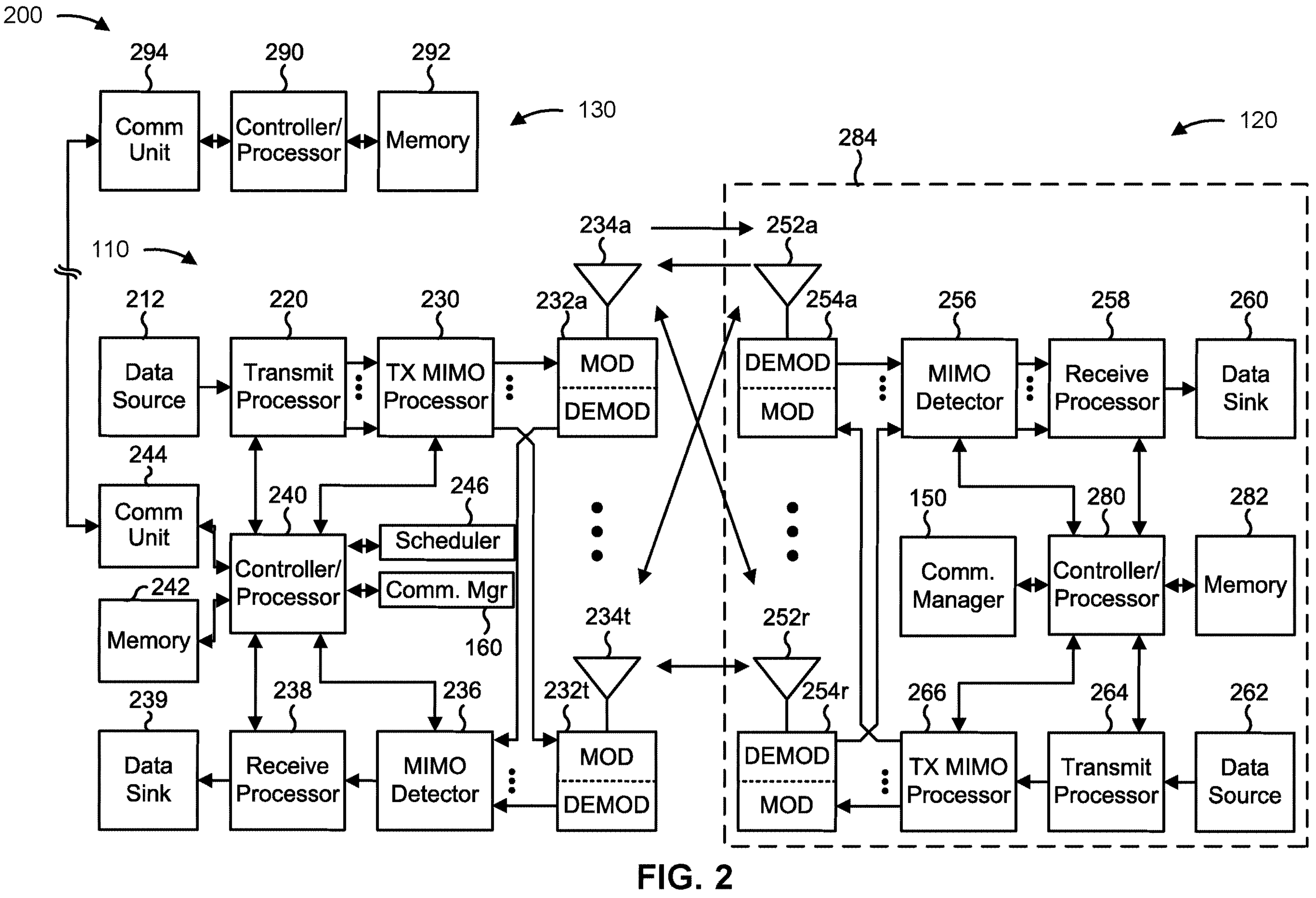
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-13).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-13).

Controller/processor 240 of the base station 110, controller/processor 280 of the UE 120, and/or any other component(s) of FIG. 2 may perform one or more techniques associated with configuring a forwarding device, as described in more detail elsewhere herein. For example, controller/processor 240 of base station 110, controller/processor 280 of the UE 120, controller/processor of the forwarding device, and/or any other component(s) of FIG. 2 may perform or direct operations of, for example, process 800 of FIG. 8, process 900 of FIG. 9, process 1000 of FIG. 10, and/or other processes as described herein. Memories 242 and 282 may store data and program codes for the base station 110 and the UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110, the forwarding device, and/or the UE 120, may cause the one or more processors, the UE 120, the forwarding device, and/or the base station 110 to perform or direct operations of, for example, process 800 of FIG. 8, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a transmitting device (e.g., UE 120, base station 110) includes means for selecting an indication of a seed to be used by a forwarding device to generate a configuration for reflecting or forwarding signals, means for transmitting the indication of the seed to the forwarding device, means for transmitting the signals to a receiving device via the forwarding device, and/or means for receiving, from the receiving device, measurements of the signals. In some aspects, the means for the transmitting device to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, scheduler 246, communication manager 160, transmit processor 220, TX MIMO processor 230, modulator 232, antenna 234, demodulator 232, MIMO detector 236, receive processor 238, controller/processor 240, memory 242, or scheduler 246.

In some aspects, the forwarding device (e.g., RIS 140) includes means for receiving, from a transmitting device, an indication of a seed to be used by the forwarding device to generate a configuration for reflecting or forwarding signals transmitted from the transmitting device, means for generating the configuration based at least in part on the seed, and/or means for configuring the forwarding device to reflect or forward the signals according to the configuration. In some aspects, the means for the forwarding device to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

In some aspects, the receiving device (e.g., UE 120) includes means for receiving, from a transmitting device, an indication of a seed to be used by a forwarding device to generate a configuration for reflecting or forwarding signals transmitted from the transmitting device, and/or means for configuring the receiving device to receive signals reflected or relayed from the forwarding device based at least in part on the configuration. In some aspects, the means for the receiving device to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, scheduler 246, communication manager 160, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3 is a diagram illustrating an example 300 of using a passive device, in accordance with the present disclosure. Example 300 shows a base station (BS) 310 (e.g., BS 110) that may communicate with a UE 320 (e.g., UE 120), and a BS 330 (e.g., BS 110) that may communicate with UE 340 (e.g., UE 120).

A network may have antennas that are grouped together at a transmitter or receiver, in order to increase throughput. The grouping of antennas may be referred to as "massive MIMO." Massive MIMO may use active antenna units (AAUs) to achieve high beamforming gain. An AAU may combine an antenna, a radio, a tower-mounted amplifier, a feeder, and/or jumper functionalities into a single unit. An AAU may include an individual radio frequency (RF) chain for each antenna port.

There may be barriers to massive MIMO. The transmission of signals may be blocked by buildings, natural topography, or other blocking structures. For example, BS 310 may transmit signals to UE 320, but BS 310 may not able to transmit signals to UE 340. As shown in example 300, there is some type of blockage between BS 310 and UE 340. UE 340 may instead be served by BS 330.

In order to resolve transmission issues due to the blockage, the network may use a passive device 350 that is configured as an RIS. An RIS may be a two-dimensional surface of engineered material whose properties are reconfigurable rather than static. The engineered material may contain integrated electronic circuits and software that enable the control of a wireless medium by altering an impedance of the surface or a portion of the surface. The change in impedance may alter a phase shift and/or an angle of reflection. Scattering, absorption, reflection, and diffraction properties may be changed with time and controlled by the software. An RIS may act as a reflective lens. In one example, an RIS may include large arrays of inexpensive antennas spaced half of a wavelength apart. In another example, an RIS may include metamaterial-based planar or conformal large surfaces whose elements (e.g., square elements) have sizes and inter-distances that are smaller than the wavelength. Each of the elements may have a configured impedance or other surface properties that are controlled by a voltage to the element. An RIS may also be referred to as a "software-controlled metasurface" or an "intelligent reflecting surface".

The passive device 350, when configured to operate as an RIS, may not have antennas or RF chains of its own, but may include a large number of small, low-cost elements on a surface to passively reflect incident signals transmitted from BS 310. A controller of the passive device 350 may control the elements on the surface. The passive device 350 may be a smart device that is configured to use a specific angle of reflection for the signals. BS 310 may control the angle of reflection (angle of arrival, angle of departure), an amplitude, a weight, a phase, and/or a width of the elements of the passive device 350 by controlling a voltage to each of the elements. In sum, the passive device 350 may help to control a propagation environment with less power consumption than AAUs. Passive devices may even replace AAUs in the propagation environment. MIMO that uses passive devices may be referred to as "passive MIMO" or "P-MIMO". The passive device 350 may be also referred to as a "passive node" or a "P-MIMO device".

In some aspects, BS 310 may use training reference sequences with UE 340 to train the passive device 350. UE 340 may receive signals via the passive device 350 and select and report a preferred beam based at least in part on measurements of beams. For example, UE 340 may report a beam having a highest spectral efficiency signal-to-interference-plus-noise ratio (SINR). BS 310 may transmit reference signals in multiple reference signal occasions. The passive device may use a different non-codebook precoder for each reference signal occasion. Alternatively, or additionally, UE 340 may transmit signals to BS 310 via the passive device 350, and BS 310 may perform measurements on the signals.

UE 340 and BS 310, when training the passive device 350, may not have information about which beams are used, unless there is a clear signaling from the passive device 350. For example, if the training signals are codebook-based or use a matrix of known elements, then an entire codebook (and multiple element indices) may have to be signaled in order for UE 340 and BS 310 to identify the beams and associated indices. In addition, a deterministic (non-random) search for beams may be inefficient because all beam directions may be covered by a codebook, and the search may thus step through a full list of beam directions. The beam search may be especially inefficient if channel acquisition is not completed and the beams are not aligned at the passive device 350. In other words, the training and initial configuration of the passive device 350 may be inefficient and some initial communications using the passive device 350 may be degraded. Degraded communications may cause UE 340 and BS 310 to consume additional processing resources and signaling resources with retransmissions.

According to various aspects described herein, the BS 310, UE 340, or another transmitting device may generate a seed that may be used to pseudo-randomly generate a configuration for the passive device 350. The seed may include information that is used to generate a larger amount of information. The seed may include a code, an index, one or more bits, an identifier, or other information that may be used as an input to a hash or a pseudo-random generator. Pseudo-random generation of the configuration may include generating a particular configuration of beam and/or matrix properties based at least in part on the seed as an input, where the configuration has random properties but may be reproduced by any node that uses the same seed as the input. The configuration may be a hash that is a function of a seed and an identifier (ID) for the forwarding device. For example, a seed with a first sequence may, through a pseudo-random generator, output a first list of beam or element indices that are random in their selection. A seed with a second, different sequence may output a second list of beam or element indices that are random and different in their selection. However, if the first seed is again used as an input, the same first list of beam or element indices would be generated again. The transmitter may be aware of the output associated with a seed and may select the seed according to a desired configuration. Any node that has the seed may determine the configuration (e.g., weighting matrix, precoding matrix) and optimize beamforming.

The seed may be smaller in payload size than a full list of beams and/or weighting element matrix indices. As a result, the transmitting device, the passive device 350, and/or any receiving device may determine a configuration using less signaling resources. The transmitting device, the passive device 350, and/or any receiving device may also conserve processing resources with quicker beam selection, because the training or beam selection does not need to wait for a time-consuming toggle through all possible beams or element configurations.

In some aspects, the seed may be used to activate or deactivate the passive device 350 or multiple other forwarding devices. If multiple forwarding devices are active, beam optimization may include joint optimization. For example, the passive device 350 may align a beam (precoding matrix) based at least in part on information about an index or precoding matrix used by another forwarding device. In some aspects, a seed may be used for indicating quasi-co-location (QCL) information so that a transmitting device and a receiving device may agree on a QCL indication pattern with less signaling than if a seed was not used.

As indicated above, FIG. 3 is provided as an example Other examples may differ from what is described with regard to FIG. 3.

Figure 4:
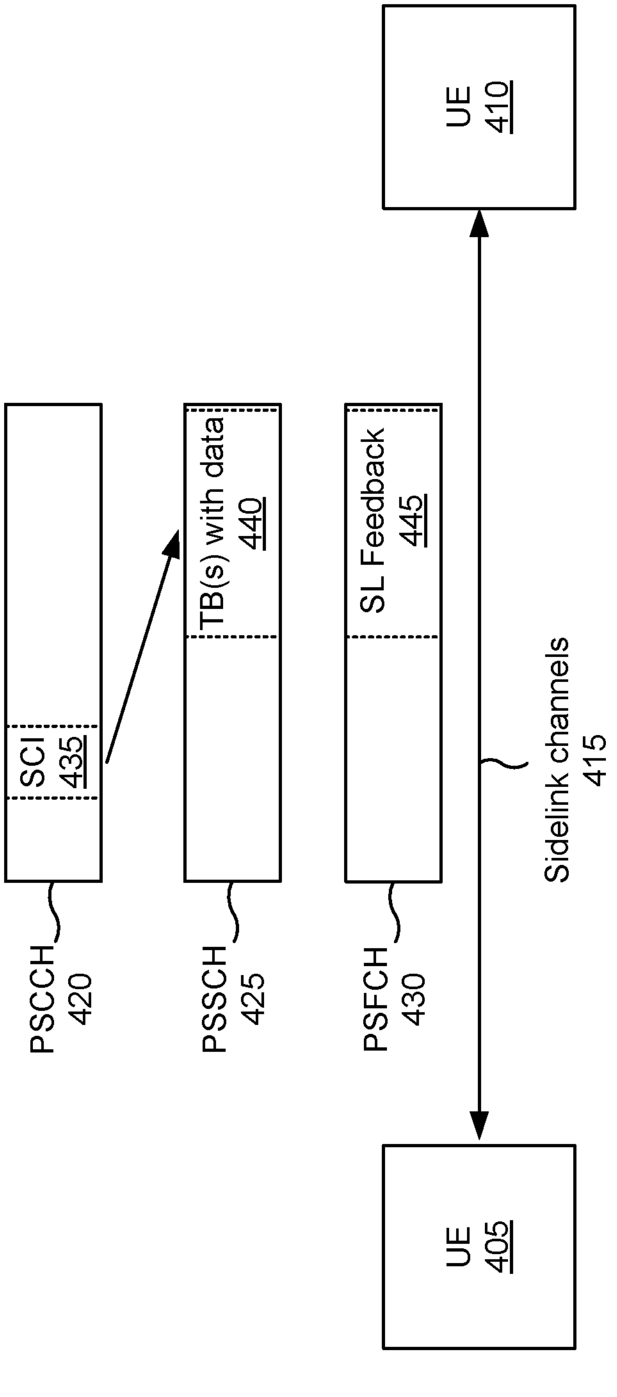
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a transmitting device, such as a first UE 405, may communicate with a receiving device, such as a second UE 410 (and one or more other UEs), via one or more sidelink channels 415. UE 405 and UE 410 may communicate using the one or more sidelink channels 415 for P2P communications, D2D communications, V2X communications (e.g., which may include V2V communications, V2I communications, and/or vehicle-to-pedestrian (V2P) communications) and/or mesh networking. In some aspects, UE 405 and UE 410 may correspond to one or more other UEs described elsewhere herein, such as UE 120. In some aspects, the one or more sidelink channels 415 may use a PC5 interface and/or may operate in a high frequency band (e.g., the 5.9 GHz band). Additionally, or alternatively, UE 405 and UE 410 may synchronize timing of transmission time intervals (TTIs) (e.g., frames, subframes, slots, or symbols) using global navigation satellite system (GNSS) timing.

As further shown in FIG. 4, the one or more sidelink channels 415 may include a physical sidelink control channel (PSCCH) 420, a physical sidelink shared channel (PSSCH) 425, and/or a physical sidelink feedback channel (PSFCH) 430. The PSCCH 420 may be used to communicate control information, similar to a physical downlink control channel (PDCCH) and/or a physical uplink control channel (PUCCH) used for cellular communications with a base station 110 via an access link or an access channel. The PSSCH 425 may be used to communicate data, similar to a physical downlink shared channel (PDSCH) and/or a physical uplink shared channel (PUSCH) used for cellular communications with a base station 110 via an access link or an access channel. For example, the PSCCH 420 may carry sidelink control information (SCI) 435, which may indicate various control information used for sidelink communications, such as one or more resources (e.g., time resources, frequency resources, and/or spatial resources) where a transport block (TB) 440 may be carried on the PSSCH 425. The TB 440 may include data. The PSFCH 430 may be used to communicate sidelink feedback 445, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 415 may use resource pools. For example, a scheduling assignment (e.g., included in SCI 435) may be transmitted in sub-channels using specific resource blocks (RBs) across time. In some aspects, data transmissions (e.g., on the PSSCH 425) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, UE 405 may operate using a transmission mode where resource selection and/or scheduling is performed by UE 405 (e.g., rather than a base station 110). In some aspects, UE 405 may perform resource selection and/or scheduling by sensing channel availability for transmissions. For example, UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, UE 405 may perform resource selection and/or scheduling using SCI 435 received in the PSCCH 420, which may indicate occupied resources and/or channel parameters. Additionally, or alternatively, UE 405 may perform resource selection and/or scheduling by determining a channel busy rate (CBR) associated with various sidelink channels, which may be used for rate control (e.g., by indicating a maximum number of resource blocks that UE 405 can use for a particular set of subframes).

In the transmission mode where resource selection and/or scheduling is performed by UE 405, UE 405 may generate sidelink grants, and may transmit the grants in SCI 435. A sidelink grant may indicate, for example, one or more parameters (e.g., transmission parameters) to be used for an upcoming sidelink transmission, such as one or more resource blocks to be used for the upcoming sidelink transmission on the PSSCH 425 (e.g., for TBs 440), one or more subframes to be used for the upcoming sidelink transmission, and/or a modulation and coding scheme (MCS) to be used for the upcoming sidelink transmission. In some aspects, UE 405 may generate a sidelink grant that indicates one or more parameters for semi-persistent scheduling (SPS), such as a periodicity of a sidelink transmission. Additionally, or alternatively, UE 405 may generate a sidelink grant for event-driven scheduling, such as for an on-demand sidelink message. In some aspects, UE 405 may transmit communications to UE 410 via a forwarding device, such as the passive device 350 that is configured to operate as an RIS, or an AF relay node. UE 405 may configure the forwarding device, and also configure UE 410 to use the forwarding device, by transmitting a seed that may be used to generate a configuration for the forwarding device.

As indicated above, FIG. 4 is provided as an example. Other examples may differ from what is described with respect to FIG. 4.

Figure 5:
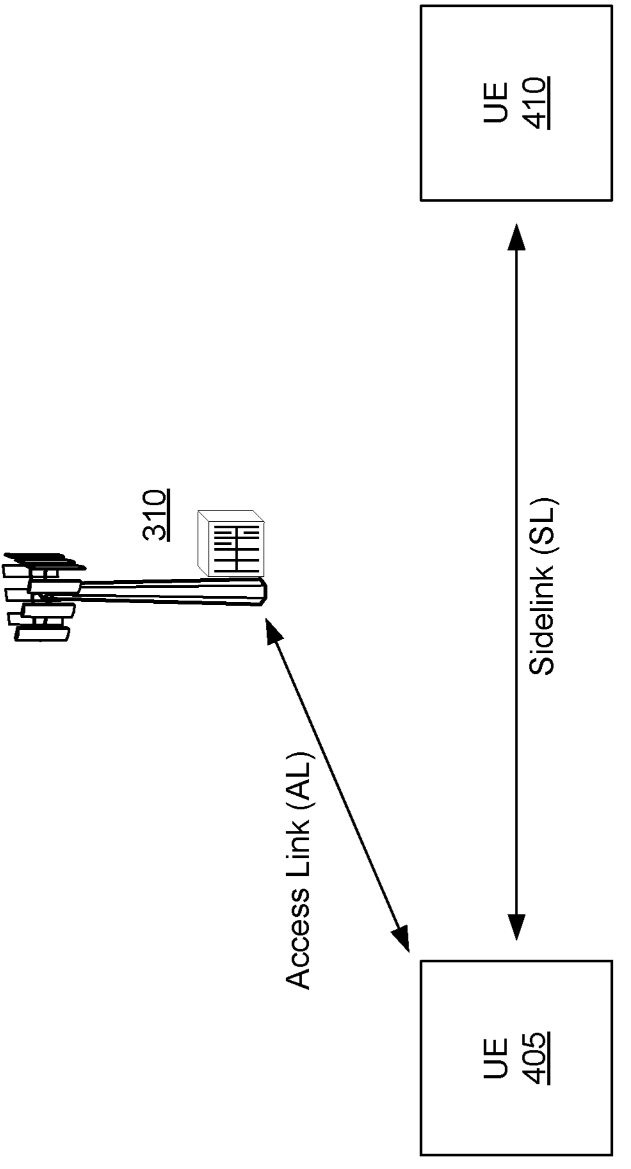
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, UE 405 and UE 410 may communicate with one another via a sidelink, as described above in connection with FIG. 4. As further shown, in some sidelink modes, the BS 310 may communicate with UE 405 via a first access link. In some sidelink modes, the base station 110 assists with scheduling communication resources. In other sidelink modes, UE 405 schedules communication resources for UE 410, rather than the base station 110. UE 405 and UE 410 may correspond to one or more UEs described elsewhere herein, such as the UE 120 of FIG. 1. Thus, a direct link between UEs 120 (e.g., via a PC5 interface) may be referred to as a sidelink, and a direct link between the base station and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110). In some aspects, the BS 310 may provide the seed to UE 405.

As indicated above, FIG. 5 is provided as an example. Other examples may differ from what is described with respect to FIG. 5.

Figure 6:
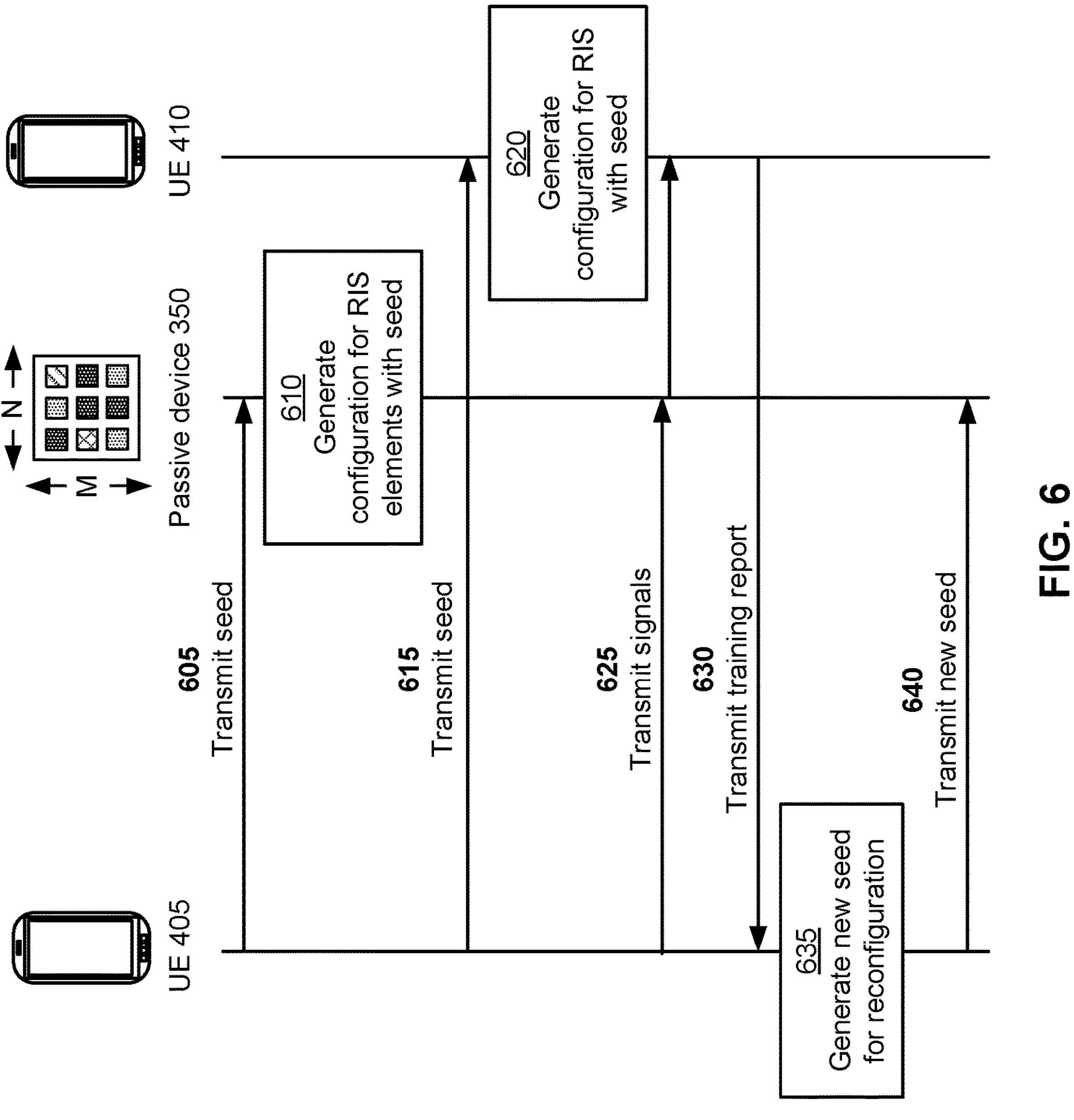
FIG. 6 is a diagram illustrating an example of configuring a forwarding device with a seed, in accordance with the present disclosure.

FIG. 6 is a diagram illustrating an example 600 of configuring a forwarding device with a seed, in accordance with the present disclosure. As shown in FIG. 6, UE 405 may communicate with UE 410 via one or more sidelink channels. UE 405 may transmit signals to UE 410 via a forwarding device. The forwarding device may be a passive device configured as an RIS, such as the passive device 350 shown in example 600, or the forwarding device may be an AF relay node that amplifies and forwards signals using multiple configurable antennas. UE 405 and UE 410 may be served by a wireless network (e.g., wireless network 100).

As shown by reference number 605, UE 405 may generate or select a seed that corresponds to a configuration for a forwarding device. For example, the configuration may include a set of weights for elements of the passive device 350 or a set of antenna weights for an AF relay node. As shown by reference number 610, UE 405 may transmit the seed to a receiving device, such as UE 410. This may include transmitting an indication of the seed, such as a seed index.

As shown by reference number 610, the passive device 350 may use the seed as an input for a pseudo-random generator to generate a configuration that indicates a column M of vertical elements from a set of columns of the passive device 350 and a row N of horizontal elements from a set of rows of the passive device 350. The elements may correspond to an RIS beamforming codebook, where the size of the codebook is M×N×L, and where L is a quantity of possible beams. Each reflective element or antenna element of a forwarding device may be assigned a weight according to a weighting matrix. If an RIS codebook is not used, a controller of the passive device 350 may generate a phase or beam matrix of size M×N. As an input to a pseudo-random generator, the controller may use an element index of the passive device 350 to distinguish between element weights of the passive device 350 or other inputs. The pseudo-random generation of weights may be per forwarding device, per element of a passive device, or per antenna of an AF relay node.

As shown by reference number 615, UE 405 may transmit the seed (or an indication of the seed) to UE 410. The seed may also be transmitted to other forwarding devices and receiving devices. As shown by reference number 620, UE 410, as a receiving device, may use the seed to generate the configuration used by the passive device 350. UE 410 may use element weights in the configuration for the passive device 350 for beamforming and/or to measure signals reflected from the passive device 350. The seed may also inform UE 410 for which receiving occasions the passive device 350 is active.

As shown by reference number 625, UE 405 may transmit signals (e.g., reference signals) to UE 410 via reflection by the passive device 350. The signals may be used for training the passive device 350. UE 410 may measure the signals. UE 410 may generate a training report that associates measurements with a beam or element matrix indicated by the configuration. As shown by reference number 630, UE 410 may transmit the training report to UE 405. UE 405 may use the training report for channel estimation, to compute channel rates, or to determine other metrics. UE 405 may transmit the report to a base station, and the base station may use the training report for channel estimation, to compute channel rates, or to determine other metrics. For sidelink mode 1, the base station may schedule sidelink resources and use of the passive device 350 based at least in part on the training report.

UE 405 or the base station may generate a new configuration (e.g., new matrix, new beam list) for the passive device 350 based at least in part on the training report. The new configuration may involve down-selecting a beam list to refine the beams that may be part of a configuration for the passive device 350. As shown by reference number 635, UE 405 or the base station may generate a new seed for the new configuration. Generating the new seed may include selecting the new (different) seed from among multiple seeds.

To continue or complete the training of the passive device 350, UE 405 may transmit the new seed to the passive device 350, as shown by reference number 640. The passive device 350 may use the new seed as an input to generate the new configuration. The passive device 350 may reconfigure the surface according to the new configuration. An index of a last output may be shifted to continue training or to start a new training. If the transmitting device is a base station, such as BS 310, one or more seeds may be indicated in downlink control information (DCI). Alternatively, or additionally, UE 410 may transmit signals to UE 405 or BS 310 via the passive device 350. That is, UE 410 may be the transmitting device and UE 405 or BS 310 may be the receiving device.

As indicated above, FIG. 6 is provided as an example. Other examples may differ from what is described with regard to FIG. 6.

Figure 7:
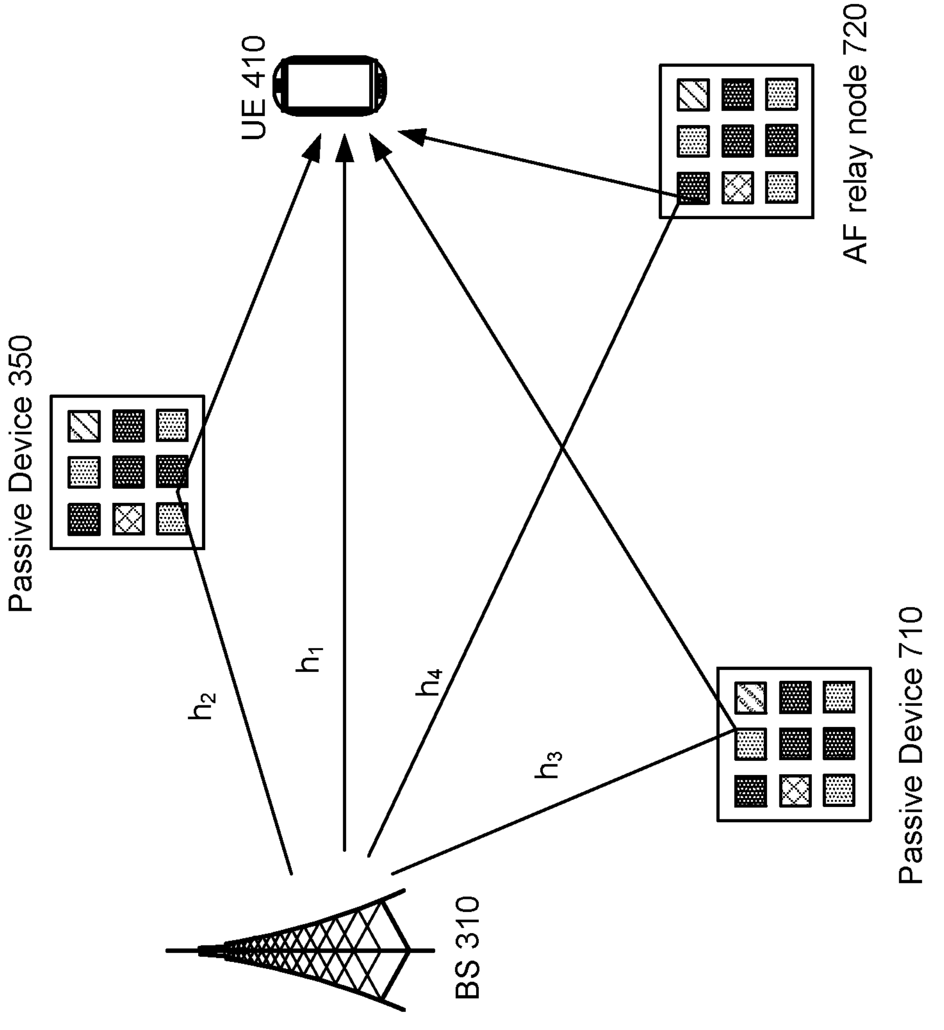
FIG. 7 is a diagram illustrating an example of training with multiple forwarding devices, in accordance with the present disclosure.

FIG. 7 is a diagram illustrating an example 700 of training with multiple forwarding devices, in accordance with the present disclosure. Example 700 shows BS 310, UE 410, and the passive device 350. Example 700 also shows other forwarding devices, such as passive device 710 and an AF relay node 720.

In some aspects, a transmitting device (e.g., BS 310, UE 405) may use the same seed for training multiple forwarding devices. For example, the transmitting device may transmit seeds hi to ha (all the same seed) to passive device 350, UE 340, passive device 710, and AF relay node 720. Each of these devices may reflect or beamform based at least in part on the configuration generated from the seed and other forwarding devices that use the configuration.

The training of forwarding devices may include transmitting a sequence of training burst sets. Each training burst set may include multiple occasions for receiving a reference signal, and one or more of the forwarding devices may be activated or deactivated for each occasion. The transmitting device may use a seed to activate or deactivate forwarding devices, and the seed may be transmitted with a forwarding device ID. For example, a seed for training burst set 0 may activate passive device 350 for a first occasion and deactivate passive device 710 for another occasion. More than one forwarding device may be activated for a training burst. For example, seeds transmitted for training burst set 1 may activate both passive device 350 and passive device 720 for the first occasion. The activations may be selected according to random properties. Using seeds for activation and deactivation may help with training and channel estimation while conserving signaling resources, because no extra signaling is needed to activate or deactivate the forwarding devices.

In some aspects, a transmitting device (e.g., BS 310, UE 240) may define multiple seeds (e.g., hi to ha) that may be transmitted in a radio resource control (RRC) message or in a medium access control control element (MAC-CE). The multiple seeds may be used to change beams, activate multiple forwarding devices, or deactivate multiple forwarding devices. The transmitting device may provide the same seed (same behavior or codebook/precoding indices) or different seeds (different behaviors or codebook/precoding indices) to each forwarding device or to a group of forwarding devices. The selection of the multiple seeds may be coordinated for multiple forwarding devices.

Each PDSCH communication (i.e., downlink data packet) may include DMRS, and a base station may need to indicate, to a UE, an association between reference signals and the DMRS in order for the UE to determine second order statistics (e.g., Doppler shift, delay spread). The association may involve quasi co-location (QCL). The UE may follow a QCL indication to determine a receive beam or a transmit beam for antenna ports of the UE. Two antenna ports may be QCLed if large-scale properties of the channel over which a symbol on one antenna port is conveyed can be inferred from the channel over which a symbol on the other antenna port is conveyed. There are four types of QCL that are defined in NR: QCL-TypeA {Doppler shift, Doppler spread, average delay, delay spread}, QCL-TypeB {Doppler shift, Doppler spread}, QCL-TypeC {Doppler shift, average delay}, and QCL-TypeD {Spatial Rx parameter}.

In some aspects, BS 310, in sidelink mode 1, may signal a QCL indication to a transmitting device (e.g., UE 405) using a seed, to help UE 405 to determine a receive beam and/or a transmit beam. For example, instead of dynamically indicating a spatial QCL, BS 310 may use one or more seeds to indicate how UE 405 should update its QCL assumption based at least in part on a predefined pattern. The pattern may be used for tracking a sidelink channel A seed may indicate a spatial relation, a transmission control indicator (TCI) state, or a spatial QCL. The seed may be only as large as needed to indicate a QCL change. In some aspects, UE 405 may not be able to determine a precoding matrix applied to each forwarding device, but the UE may have sufficient information to determine a receive beam or a transmit beam.

By using a seed as an input to a pseudo-random generator for a beam or matrix configuration, a transmitting device may use less overhead for training forwarding devices.

Figure 8:
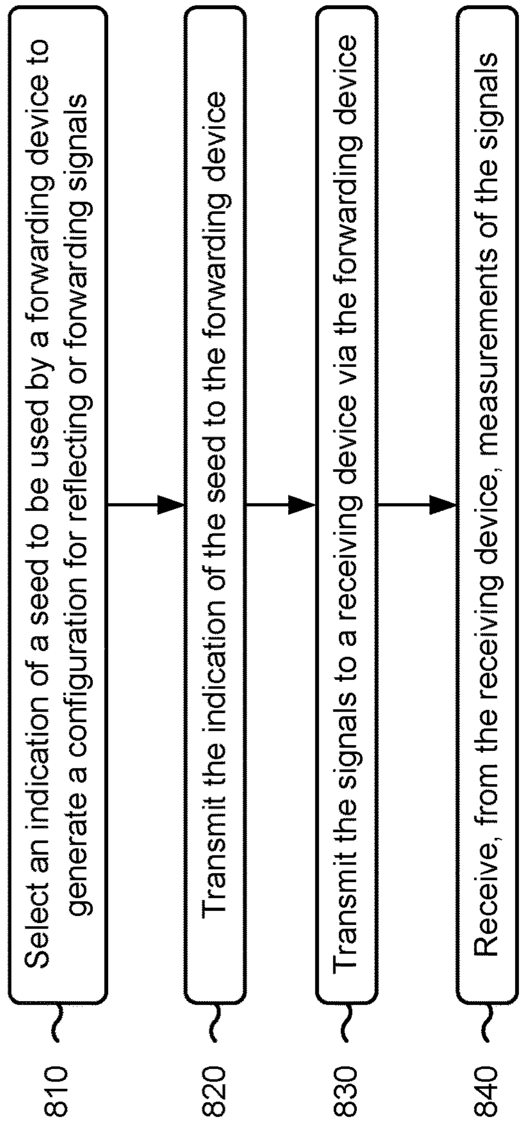
FIG. 8 is a diagram illustrating an example process performed, for example, by a transmitting device, in accordance with the present disclosure.

FIG. 8 is a diagram illustrating an example process 800 performed, for example, by a transmitting device, in accordance with the present disclosure. Example process 800 is an example where the transmitting device (e.g., BS 310, UE 405, UE 410) performs operations associated with configuring a forwarding device.

As shown in FIG. 8, in some aspects, process 800 may comprise selecting an indication of a seed to be used by a forwarding device to generate a configuration for reflecting or forwarding signals (block 810). For example, the transmitting device (e.g., using component manager 150 or seed component 1108 depicted in FIG. 11) may select an indication of a seed to be used by a forwarding device to generate a configuration for reflecting or forwarding signals, as described above.

As further shown in FIG. 8, in some aspects, process 800 may comprise transmitting the indication of the seed to the forwarding device (block 820). For example, the transmitting device (e.g., using component manager 150 or transmission component 1104 depicted in FIG. 11) may transmit the indication of the seed to the forwarding device, as described above.

As further shown in FIG. 8, in some aspects, process 800 may comprise transmitting the signals to a receiving device via the forwarding device (block 830). For example, the transmitting device (e.g., using component manager 150 or transmission component 1104 depicted in FIG. 11) may transmit the signals to a receiving device via the forwarding device, as described above.

As further shown in FIG. 8, in some aspects, process 800 may comprise receiving measurements of the signals (block 840). For example, the transmitting device (e.g., using component manager 150 or reception component 1102 depicted in FIG. 11) may receive measurements of the signals, as described above.

Process 800 may comprise additional aspects, such as any single aspect or any combination of aspects described below and/or in connection with one or more other processes described elsewhere herein.

In a first aspect, the forwarding device is a passive device configured to operate as an RIS, and the configuration is a surface configuration.

In a second aspect, alone or in combination with the first aspect, the forwarding device is an AF relay node, and the configuration is a beam configuration.

In a third aspect, alone or in combination with one or more of the first and second aspects, process 800 comprises one or more of adjusting the configuration, selecting a different seed, or performing channel estimation, based at least in part on the measurements.

In a fourth aspect, alone or in combination with one or more of the first through third aspects, the configuration corresponds to a weighting matrix with weights assigned to reflective elements or antenna elements of the forwarding device.

In a fifth aspect, alone or in combination with one or more of the first through fourth aspects, the seed activates or deactivates the forwarding device.

In a sixth aspect, alone or in combination with one or more of the first through fifth aspects, process 800 comprises transmitting an identifier of the forwarding device with the seed.

In a seventh aspect, alone or in combination with one or more of the first through sixth aspects, the seed indicates a set of columns used for a codebook.

In an eighth aspect, alone or in combination with one or more of the first through seventh aspects, process 800 comprises transmitting an indication of a new configuration for the seed or an indication of one or more beams to be associated with the seed.

In a ninth aspect, alone or in combination with one or more of the first through eighth aspects, process 800 comprises defining, by the transmitting device, multiple seeds for one or more of changing beams for multiple forwarding devices, activating multiple forwarding devices, or deactivating multiple forwarding devices, and transmitting, by the transmitting device, an indication of the multiple seeds in an RRC message or a MAC-CE.

In a tenth aspect, alone or in combination with one or more of the first through ninth aspects, the seed indicates quasi-co-location information for the configuration.

In an eleventh aspect, alone or in combination with one or more of the first through tenth aspects, selecting the seed comprises receiving, from another device, an indication of the seed to use.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
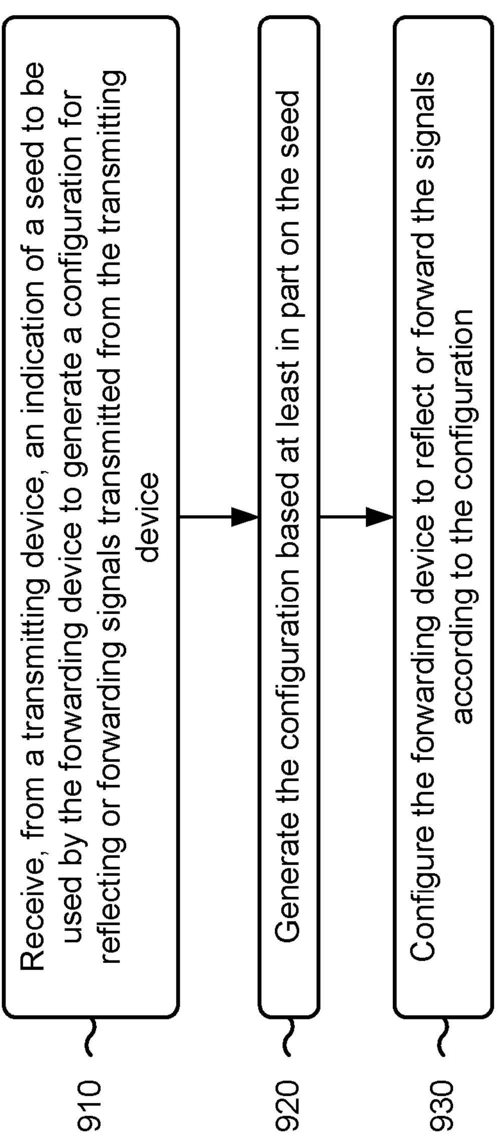
FIG. 9 is a diagram illustrating an example process performed, for example, by a forwarding device, in accordance with the present disclosure.

FIG. 9 is a diagram illustrating an example process 900 performed, for example, by a forwarding device, in accordance with the present disclosure. Example process 900 is an example where the forwarding device (e.g., passive device 350, passive device 710, AF relay node 720) performs operations associated with configuring a forwarding device.

As shown in FIG. 9, in some aspects, process 900 may comprise receiving an indication of a seed to be used by the forwarding device to generate a configuration for reflecting or forwarding signals transmitted from the transmitting device (block 910). For example, the forwarding device (e.g., using component manager 150 or reception component 1202 depicted in FIG. 12) may receive an indication of a seed to be used by the forwarding device to generate a configuration for reflecting or forwarding signals transmitted from the transmitting device, as described above.

As further shown in FIG. 9, in some aspects, process 900 may comprise generating the configuration based at least in part on the seed (block 920). For example, the forwarding device (e.g., using component manager 150 or generation component 1208 depicted in FIG. 12) may generate the configuration based at least in part on the seed, as described above.

As further shown in FIG. 9, in some aspects, process 900 may comprise configuring the forwarding device to reflect or forward the signals according to the configuration (block 930). For example, the forwarding device (e.g., using component manager 150 or configuration component 1210 depicted in FIG. 12) may configure the forwarding device to reflect or forward the signals according to the configuration, as described above.

Process 900 may comprise additional aspects, such as any single aspect or any combination of aspects described below and/or in connection with one or more other processes described elsewhere herein.

In a first aspect, the forwarding device is a passive device configured to operate as an RIS, and the configuration is a surface configuration.

In a second aspect, alone or in combination with the first aspect, the forwarding device is an AF relay node, and the configuration is a beam configuration.

In a third aspect, alone or in combination with one or more of the first and second aspects, generating the configuration comprises pseudo-randomly generating the configuration with the seed as an input.

In a fourth aspect, alone or in combination with one or more of the first through third aspects, the configuration is pseudo-randomly generated per reflective element or per antenna element.

In a fifth aspect, alone or in combination with one or more of the first through fourth aspects, the configuration corresponds to a weighting matrix with weights assigned to reflective elements or antenna elements of the forwarding device, and configuring the forwarding device comprises configuring the reflective elements or antenna elements according to the weights.

In a sixth aspect, alone or in combination with one or more of the first through fifth aspects, process 900 comprises activating or deactivating the forwarding device based at least in part on the seed.

In a seventh aspect, alone or in combination with one or more of the first through sixth aspects, process 900 comprises receiving an identifier, and configuring the forwarding device comprises configuring the forwarding device if the identifier is associated with the forwarding device.

In an eighth aspect, alone or in combination with one or more of the first through seventh aspects, the seed indicates a set of columns used for a codebook, and configuring the forwarding device comprises configuring the forwarding device based at least in part on the set of columns.

In a ninth aspect, alone or in combination with one or more of the first through eighth aspects, process 900 comprises receiving an indication of a new configuration for the seed or an indication of one or more beams to be associated with the seed, and configuring the forwarding device comprises configuring the forwarding device based at least in part on the new configuration or the one or more beams.

In a tenth aspect, alone or in combination with one or more of the first through ninth aspects, the seed indicates QCL information, and configuring the forwarding device comprises configuring the forwarding device based at least in part on the QCL information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
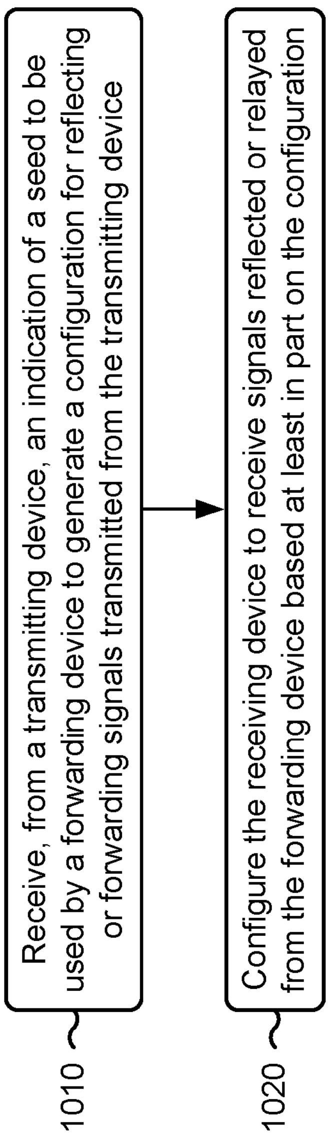
FIG. 10 is a diagram illustrating an example process performed, for example, by a receiving device, in accordance with the present disclosure.
Figure 10:

FIG. 10 is a diagram illustrating an example process 1000 performed, for example, by a receiving device, in accordance with the present disclosure. Example process 1000 is an example where the receiving device (e.g., UE 410, BS 310, UE 405) performs operations associated with configuring a forwarding device.

As shown in FIG. 10, in some aspects, process 1000 may comprise receiving an indication of a seed to be used by a forwarding device to generate a configuration for reflecting or forwarding signals transmitted from the transmitting device (block 1010). For example, the receiving device (e.g., using component manager 150 or reception component 1302 depicted in FIG. 13) may receive an indication of a seed to be used by a forwarding device to generate a configuration for reflecting or forwarding signals transmitted from the transmitting device, as described above.

As further shown in FIG. 10, in some aspects, process 1000 may comprise configuring the receiving device to receive signals reflected or relayed from the forwarding device based at least in part on the configuration (block 1020). For example, the receiving device (e.g., using component manager 150 or configuration component 1308 depicted in FIG. 13) may configure the receiving device to receive signals reflected or relayed from the forwarding device based at least in part on the configuration, as described above.

Process 1000 may include additional aspects, such as any single aspect or any combination of aspects described below and/or in connection with one or more other processes described elsewhere herein.

In a first aspect, generating the configuration comprises pseudo-randomly generating the configuration with the seed as an input.

In a second aspect, alone or in combination with the first aspect, the configuration corresponds to a weighting matrix with weights assigned to reflective elements or antenna elements of the forwarding device, and configuring the receiving device comprises configuring a receive beam of the receiving device based at least in part on the weights of the reflective elements or antenna elements.

In a third aspect, alone or in combination with one or more of the first and second aspects, the seed indicates a set of columns used for a codebook, and configuring the receiving device comprises configuring a receive beam of the receiving device to receive the signals reflected or relayed from the forwarding device, based at least in part on the set of columns.

In a fourth aspect, alone or in combination with one or more of the first through third aspects, process 1000 comprises receiving an indication of a new configuration for the seed or an indication of one or more beams to be associated with the seed, and configuring the receiving device comprises configuring a receive beam of the receiving device to receive the signals reflected or relayed from the forwarding device, based at least in part on the new configuration or the one or more beams.

In a fifth aspect, alone or in combination with one or more of the first through fourth aspects, the seed indicates QCL information, and configuring the receiving device comprises configuring a receive beam of the receiving device to receive the signals reflected or relayed from the forwarding device, based at least in part on the QCL information.

In a sixth aspect, alone or in combination with one or more of the first through fifth aspects, the forwarding device is a passive device configured to operate as a reconfigurable intelligent surface or an amplify and forward relay node.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
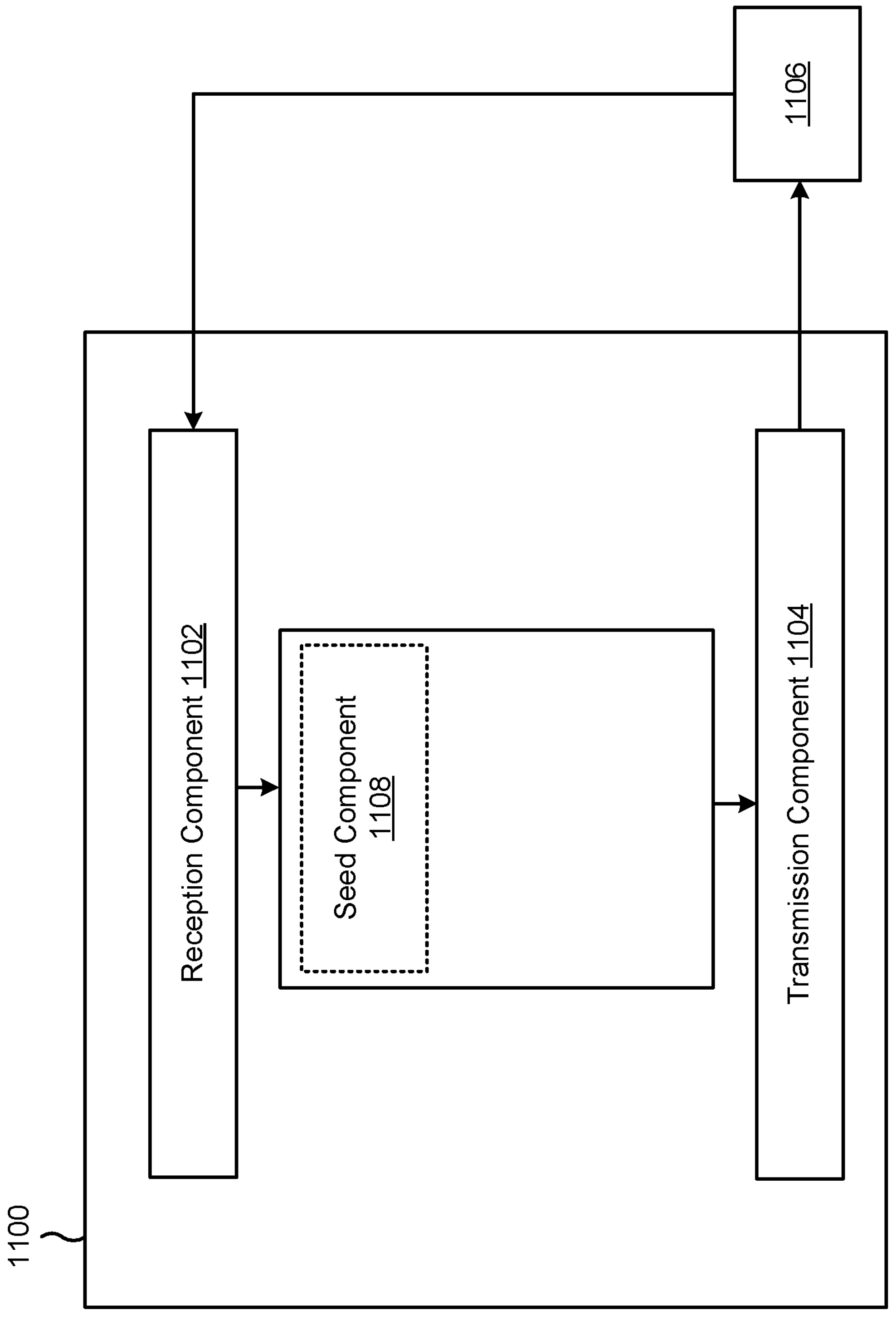
FIGS. 11-13 are block diagrams of example apparatuses for wireless communication, in accordance with the present disclosure.

FIG. 11 is a block diagram of an example apparatus 1100 for wireless communication. The apparatus 1100 may be a transmitting device (e.g., base station, UE), or a transmitting device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, passive device configured to operate as an RIS, AF relay node, or another wireless communication device) using the reception component 1102 and the transmission component 1104. As further shown, the apparatus 1100 may include a seed component 1108, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 800 of FIG. 8. In some aspects, the apparatus 1100 and/or one or more components shown in FIG. 11 may include one or more components of the transmitting device described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the transmitting device described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the transmitting device described above in connection with FIG. 2. In some aspects, the transmission component 1104 may be co-located with the reception component 1102 in a transceiver.

The seed component 1108 may select an indication of a seed to be used by a forwarding device to generate a configuration for reflecting or forwarding signals. The transmission component 1104 may transmit the indication of the seed to the forwarding device. The transmission component 1104 may transmit the signals to a receiving device via the forwarding device. The reception component 1102 may receive measurements of the signals.

The transmission component 1104 may transmit an identifier of the forwarding device with the seed. The transmission component 1104 may transmit an indication of a new configuration for the seed or an indication of one or more beams to be associated with the seed.

The seed component 1108 may define multiple seeds for one or more of changing beams for multiple forwarding devices, activating multiple forwarding devices, or deactivating multiple forwarding devices. The transmission component 1104 may transmit an indication of the multiple seeds in an RRC message or a MAC-CE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
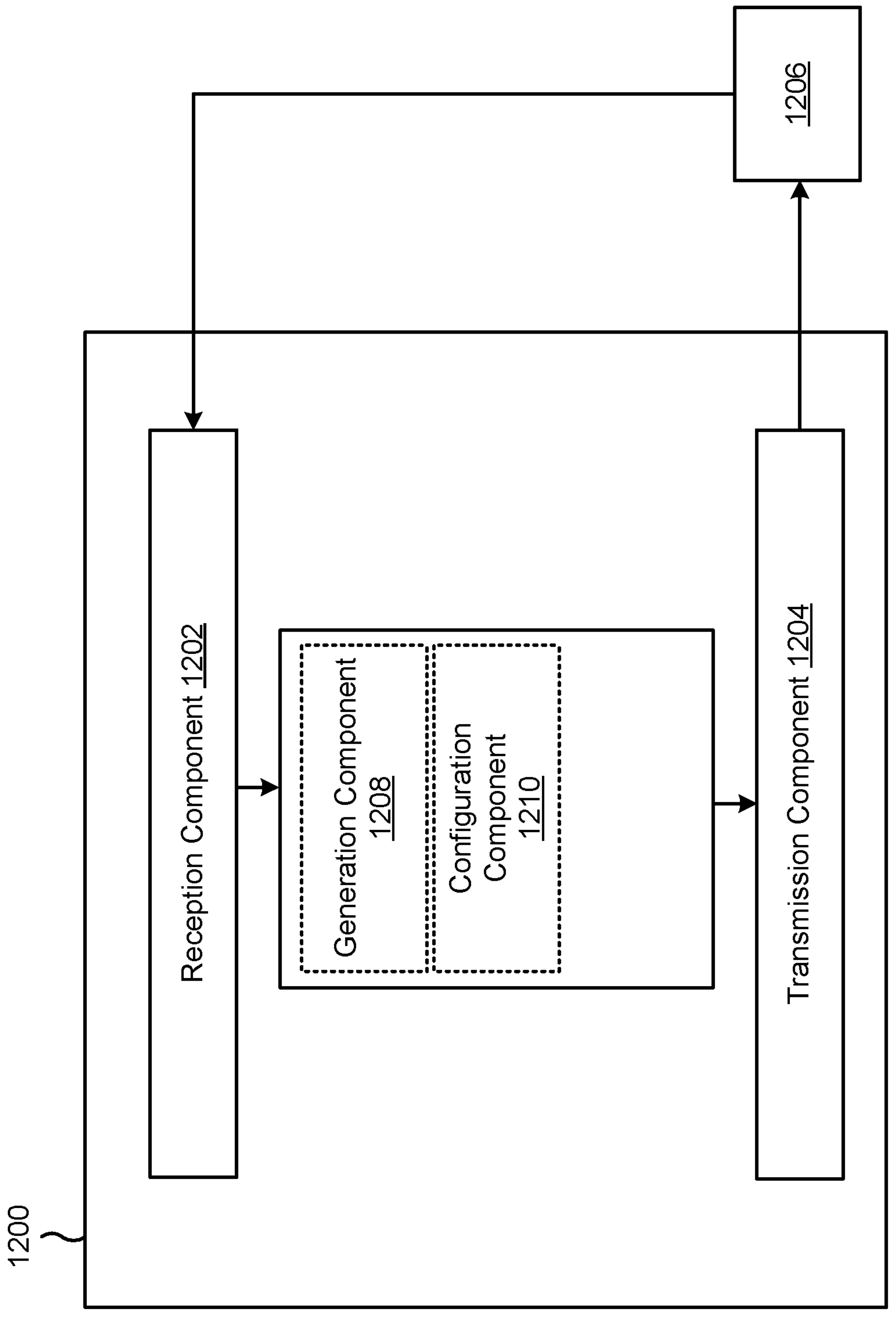

FIG. 12 is a block diagram of an example apparatus 1200 for wireless communication. The apparatus 1200 may be a forwarding device (e.g., a passive device configured to operate as an RIS, AF relay node), or a forwarding device may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a generation component 1208 and/or a configuration component 1210, among other examples.

In some aspects, the apparatus 1200 may be configured to perform one or more operations described herein in connection with FIGS. 1-7. Additionally, or alternatively, the apparatus 1200 may be configured to perform one or more processes described herein, such as process 900 of FIG. 9. In some aspects, the apparatus 1200 and/or one or more components shown in FIG. 12 may include one or more components of the forwarding device described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the forwarding device described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the forwarding device described above in connection with FIG. 2. In some aspects, the transmission component 1204 may be co-located with the reception component 1202 in a transceiver.

The reception component 1202 may receive an indication of a seed to be used by the forwarding device to generate a configuration for reflecting or forwarding signals transmitted from the transmitting device. The generation component 1208 may generate the configuration based at least in part on the seed. The configuration component 1210 may configure the forwarding device to reflect or forward the signals according to the configuration.

The configuration component 1210 may activate or deactivate the forwarding device based at least in part on the seed. The reception component 1202 may receive an identifier and configure the forwarding device if the identifier is associated with the forwarding device.

The reception component 1202 may receive an indication of a new configuration for the seed or an indication of one or more beams to be associated with the seed and configure the forwarding device based at least in part on the new configuration or the one or more beams.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
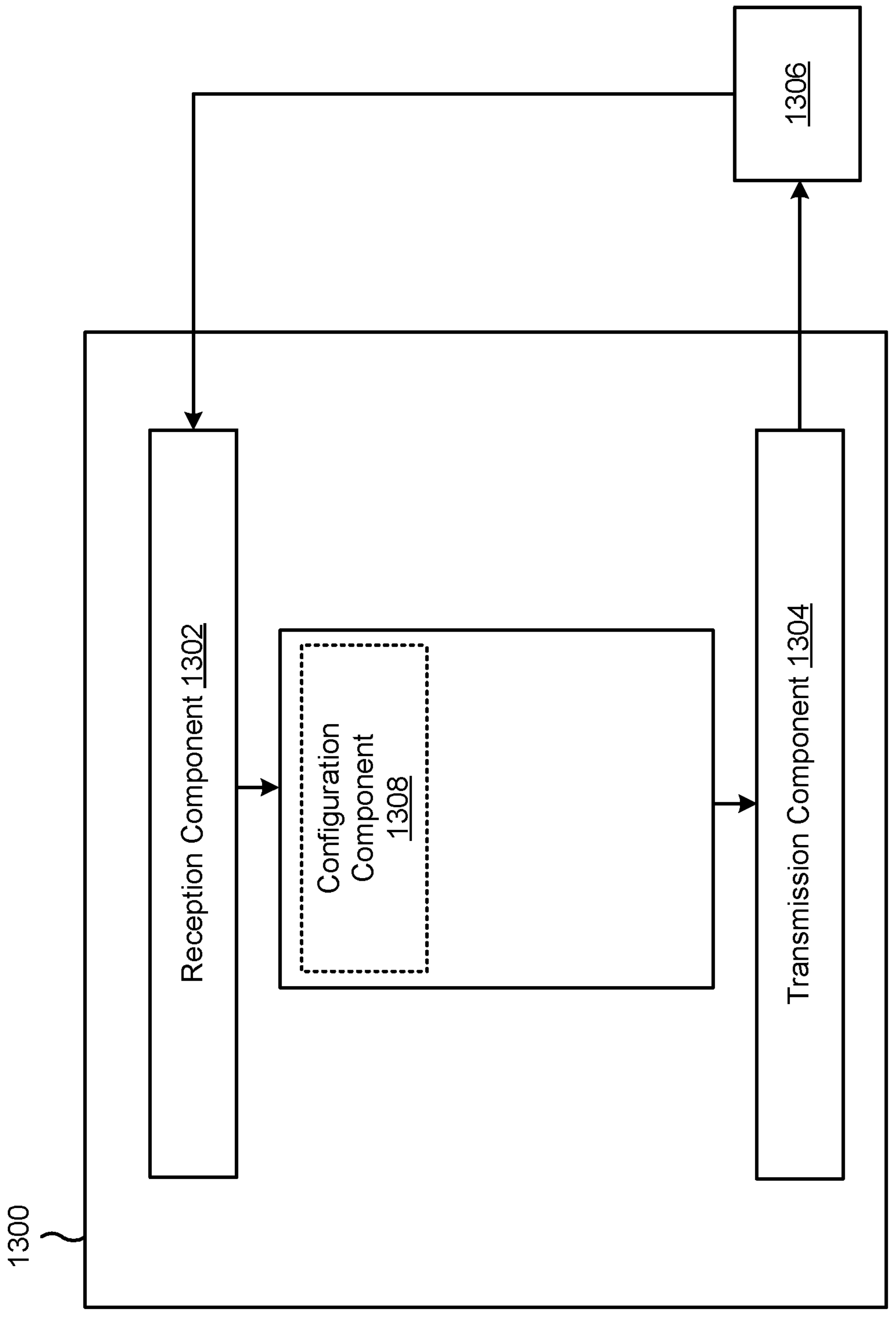

FIG. 13 is a block diagram of an example apparatus 1300 for wireless communication. The apparatus 1300 may be a receiving device (e.g., UE), or a receiving device may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a configuration component 1308, among other examples.

In some aspects, the apparatus 1300 may be configured to perform one or more operations described herein in connection with FIGS. 1-7. Additionally, or alternatively, the apparatus 1300 may be configured to perform one or more processes described herein, such as process 1000 of FIG. 10. In some aspects, the apparatus 1300 and/or one or more components shown in FIG. 13 may include one or more components of the receiving device described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the receiving device described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the receiving device described above in connection with FIG. 2. In some aspects, the transmission component 1304 may be co-located with the reception component 1302 in a transceiver.

The reception component 1302 may receive an indication of a seed to be used by a forwarding device to generate a configuration for reflecting or forwarding signals transmitted from the transmitting device. The configuration component 1308 may configure the receiving device to receive signals reflected or relayed from the forwarding device based at least in part on the configuration.

The reception component 1302 may receive an indication of a new configuration for the seed or an indication of one or more beams to be associated with the seed, and configure a receive beam of the receiving device to receive the signals reflected or relayed from the forwarding device, based at least in part on the new configuration or the one or more beams.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a transmitting device, comprising: selecting, by the transmitting device, an indication of a seed to be used by a forwarding device to generate a configuration for reflecting or forwarding signals; transmitting, by the transmitting device, the indication of the seed to the forwarding device; transmitting, by the transmitting device, the signals to a receiving device via the forwarding device; and receiving, by the transmitting device from the receiving device, measurements of the signals.

Aspect 2: The method of Aspect 1, wherein the forwarding device is a passive device configured to operate as a reconfigurable intelligent surface, and wherein the configuration is a surface configuration.

Aspect 3: The method of Aspect 1, wherein the forwarding device is an amplify and forward relay node, and wherein the configuration is a beam configuration.

Aspect 4: The method of any of Aspects 1-3, further comprising one or more of adjusting the configuration, selecting a different seed, or performing channel estimation, based at least in part on the measurements.

Aspect 5: The method of any of Aspects 1-4, wherein the configuration corresponds to a weighting matrix with weights assigned to reflective elements or antenna elements of the forwarding device.

Aspect 6: The method of any of Aspects 1-5, wherein the seed activates or deactivates the forwarding device.

Aspect 7: The method of any of Aspects 1-6, further comprising transmitting an identifier of the forwarding device with the seed.

Aspect 8: The method of any of Aspects 1-7, wherein the seed indicates a set of columns used for a codebook.

Aspect 9: The method of any of Aspects 1-8, further comprising transmitting an indication of a new configuration for the seed or an indication of one or more beams to be associated with the seed.

Aspect 10: The method of any of Aspects 1-9, further comprising: defining, by the transmitting device, multiple seeds for one or more of changing beams for multiple forwarding devices, activating multiple forwarding devices, or deactivating multiple forwarding devices; and transmitting, by the transmitting device, an indication of the multiple seeds in a radio resource control message or a medium access control control element (MAC-CE).

Aspect 11: The method of any of Aspects 1-10, wherein the seed indicates quasi-co-location information for the configuration.

Aspect 12: The method of any of Aspects 1-11, wherein selecting the seed comprises receiving, from another device, an indication of the seed to use.

Aspect 13: A method of wireless communication performed by a forwarding device, comprising: receiving, by the forwarding device from a transmitting device, an indication of a seed to be used by the forwarding device to generate a configuration for reflecting or forwarding signals transmitted from the transmitting device; generating, by the forwarding device, the configuration based at least in part on the seed; and configuring, by the forwarding device, the forwarding device to reflect or forward the signals according to the configuration.

Aspect 14: The method of Aspect 13, wherein the forwarding device is a passive device configured to operate as a reconfigurable intelligent surface, and wherein the configuration is a surface configuration.

Aspect 15: The method of Aspect 13, wherein the forwarding device is an amplify and forward relay node, and wherein the configuration is a beam configuration.

Aspect 16: The method of any of Aspects 13-15, wherein generating the configuration comprises pseudo-randomly generating the configuration with the seed as an input.

Aspect 17: The method of Aspect 16, wherein the configuration is pseudo-randomly generated per reflective element or per antenna element.

Aspect 18: The method of any of Aspects 13-17, wherein the configuration corresponds to a weighting matrix with weights assigned to reflective elements or antenna elements of the forwarding device, and wherein configuring the forwarding device comprises configuring the reflective elements or antenna elements according to the weights.

Aspect 19: The method of any of Aspects 13-18, further comprising activating or deactivating the forwarding device based at least in part on the seed.

Aspect 20: The method of any of Aspects 13-19, further comprising receiving an identifier, wherein configuring the forwarding device comprises configuring the forwarding device if the identifier is associated with the forwarding device.

Aspect 21: The method of any of Aspects 13-20, wherein the seed indicates a set of columns used for a codebook, and wherein configuring the forwarding device comprises configuring the forwarding device based at least in part on the set of columns Aspect 22: The method of any of Aspects 13-21, further comprising receiving an indication of a new configuration for the seed or an indication of one or more beams to be associated with the seed, and wherein configuring the forwarding device comprises configuring the forwarding device based at least in part on the new configuration or the one or more beams.

Aspect 23: The method of any of Aspects 13-22, wherein the seed indicates quasi-co-location (QCL) information, and wherein configuring the forwarding device comprises configuring the forwarding device based at least in part on the QCL information.

Aspect 24: A method of wireless communication performed by a receiving device, comprising: receiving, by the receiving device from a transmitting device, an indication of a seed to be used by a forwarding device to generate a configuration for reflecting or forwarding signals transmitted from the transmitting device; and configuring, by the receiving device, the receiving device to receive signals reflected or relayed from the forwarding device based at least in part on the configuration.

Aspect 25: The method of Aspect 24, wherein generating the configuration comprises pseudo-randomly generating the configuration with the seed as an input.

Aspect 26: The method of Aspect 24 or 25, wherein the configuration corresponds to a weighting matrix with weights assigned to reflective elements or antenna elements of the forwarding device, and wherein configuring the receiving device comprises configuring a receive beam of the receiving device based at least in part on the weights of the reflective elements or antenna elements.

Aspect 27: The method of any of Aspects 24-26, wherein the seed indicates a set of columns used for a codebook, and wherein configuring the receiving device comprises configuring a receive beam of the receiving device to receive the signals reflected or relayed from the forwarding device, based at least in part on the set of columns Aspect 28: The method of any of Aspects 24-27, further comprising receiving an indication of a new configuration for the seed or an indication of one or more beams to be associated with the seed, and wherein configuring the receiving device comprises configuring a receive beam of the receiving device to receive the signals reflected or relayed from the forwarding device, based at least in part on the new configuration or the one or more beams.

Aspect 29: The method of any of Aspects 24-28, wherein the seed indicates quasi-co-location (QCL) information, and wherein configuring the receiving device comprises configuring a receive beam of the receiving device to receive the signals reflected or relayed from the forwarding device, based at least in part on the QCL information.

Aspect 30: The method of any of Aspects 24-29, wherein the forwarding device is a passive device configured to operate as a reconfigurable intelligent surface or an amplify and forward relay node.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the memory and the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitting device for wireless communication, comprising:

a memory; and one or more processors, coupled to the memory, configured to:

select an indication of a seed to be used by a forwarding device to generate a configuration for reflecting or forwarding signals by using the seed as an input to a pseudo-random generator;

transmit the indication of the seed to the forwarding device;

transmit the signals to a receiving device via the forwarding device; and receive measurements of the signals.

2. The transmitting device of claim 1, wherein the forwarding device is a passive device configured to operate as a reconfigurable intelligent surface, and wherein the configuration is a surface configuration.

3. The transmitting device of claim 1, wherein the forwarding device is an amplify and forward relay node, and wherein the configuration is a beam configuration.

4. The transmitting device of claim 1, wherein the one or more processors are configured to one or more of adjust the configuration, select a different seed, or perform channel estimation, based at least in part on the measurements.

5. The transmitting device of claim 1, wherein the configuration corresponds to a weighting matrix with weights assigned to reflective elements or antenna elements of the forwarding device.

6. The transmitting device of claim 1, wherein the seed activates or deactivates the forwarding device.

7. The transmitting device of claim 1, wherein the one or more processors are configured to transmit an identifier of the forwarding device with the seed.

8. The transmitting device of claim 1, wherein the seed indicates a set of columns used for a codebook.

9. The transmitting device of claim 1, wherein the one or more processors are configured to transmit an indication of a new configuration for the seed or an indication of one or more beams to be associated with the seed.

10. The transmitting device of claim 1, wherein the one or more processors are configured to:

define multiple seeds for one or more of changing beams for multiple forwarding devices, activating multiple forwarding devices, or deactivating multiple forwarding devices; and transmit an indication of the multiple seeds in a radio resource control message or a medium access control control element (MAC-CE).

11. The transmitting device of claim 1, wherein the seed indicates quasi- co-location information for the configuration.

12. The transmitting device of claim 1, wherein the one or more processors, to select the seed, are configured to receive, from another device, an indication of the seed to use.

13. A forwarding device for wireless communication, comprising:

a memory; and one or more processors, coupled to the memory, configured to:

receive, from a transmitting device, an indication of a seed to be used by the forwarding device to pseudo-randomly generate a configuration for reflecting or forwarding signals transmitted from the transmitting device;

generate the configuration pseudo-randomly using the seed as an input; and configure the forwarding device to reflect or forward the signals according to the configuration.

14. The forwarding device of claim 13, wherein the forwarding device is a passive device configured to operate as a reconfigurable intelligent surface, and wherein the configuration is a surface configuration.

15. The forwarding device of claim 13, wherein the forwarding device is an amplify and forward relay node, and wherein the configuration is a beam configuration.

16. The forwarding device of claim 13, wherein the configuration is pseudo-randomly generated per reflective element or per antenna element.

17. The forwarding device of claim 13, wherein the configuration corresponds to a weighting matrix with weights assigned to reflective elements or antenna elements of the forwarding device, and wherein the one or more processors, to configure the forwarding device, are configured to configure the reflective elements or antenna elements according to the weights.

18. The forwarding device of claim 13, wherein the one or more processors are configured to activate or deactivate the forwarding device based at least in part on the seed.

19. The forwarding device of claim 13, wherein the one or more processors are configured to receive an identifier, and wherein the one or more processors, to configure the forwarding device, are configured to configure the forwarding device if the identifier is associated with the forwarding device.

20. The forwarding device of claim 13, wherein the seed indicates a set of columns used for a codebook, and wherein the one or more processors, to configure the forwarding device, are configured to configure the forwarding device based at least in part on the set of columns.

21. The forwarding device of claim 13, wherein the one or more processors are configured to receive an indication of a new configuration for the seed or an indication of one or more beams to be associated with the seed, and wherein the one or more processors, to configure the forwarding device, are configured to configure the forwarding device based at least in part on the new configuration or the one or more beams.

22. The forwarding device of claim 13, wherein the seed indicates quasi-co-location (QCL) information, and wherein the one or more processors, to configure the forwarding device, are configured to configure the forwarding device based at least in part on the QCL information.

23. A receiving device for wireless communication, comprising:

a memory; and one or more processors, coupled to the memory, configured to:

receive, from a transmitting device, an indication of a seed to be used by a forwarding device to pseudo-randomly generate a configuration using the seed as an input, wherein the configuration is for reflecting or forwarding signals transmitted from the transmitting device;

generate the configuration pseudo-randomly using the seed as an input; and configure the receiving device to receive signals reflected or relayed from the forwarding device based at least in part on the configuration.

24. The receiving device of claim 23, wherein the one or more processors, to generate the configuration, are configured to pseudo-randomly generate the configuration with the seed as an input.

25. The receiving device of claim 23, wherein the configuration corresponds to a weighting matrix with weights assigned to reflective elements or antenna elements of the forwarding device, and wherein the one or more processors, to configure the receiving device, are configured to configure a receive beam of the receiving device based at least in part on the weights of the reflective elements or antenna elements.

26. The receiving device of claim 23, wherein the seed indicates a set of columns used for a codebook, and wherein the one or more processors, to configure the receiving device, are configured to configure a receive beam of the receiving device to receive the signals reflected or relayed from the forwarding device, based at least in part on the set of columns.

27. The receiving device of claim 23, wherein the one or more processors are configured to receive an indication of a new configuration for the seed or an indication of one or more beams to be associated with the seed, and wherein the one or more processors, to configure the receiving device, are configured to configure a receive beam of the receiving device to receive the signals reflected or relayed from the forwarding device, based at least in part on the new configuration or the one or more beams.

28. The receiving device of claim 23, wherein the seed indicates quasi-co-location (QCL) information, and wherein the one or more processors, to configure the receiving device, are configured to configure a receive beam of the receiving device to receive the signals reflected or relayed from the forwarding device, based at least in part on the QCL information.

29. The receiving device of claim 23, wherein the forwarding device is a passive device configured to operate as a reconfigurable intelligent surface or an amplify and forward relay node.

* * * * *